United States Patent [19]

Bricker et al.

[11] 4,238,814
[45] Dec. 9, 1980

[54] COVER FOR MULTILAMP PHOTOFLASH UNIT

[75] Inventors: Daniel W. Bricker, Williamsport, Pa.; Emery G. Audesse, Beverly, Mass.; John W. Shaffer; Donald W. Hartman, both of Williamsport, Pa.

[73] Assignee: GTE Products Corporation, Stamford, Conn.

[21] Appl. No.: 72,534

[22] Filed: Sep. 4, 1979

[51] Int. Cl.³ .................. F21K 5/02; G03B 15/02; H05B 41/34
[52] U.S. Cl. .................. 362/13; 362/237; 362/238; 362/241; 362/346; 431/358; 431/359
[58] Field of Search .................. 362/13, 346, 237, 238, 362/240, 241, 247; 431/358, 359, 365

[56] References Cited

U.S. PATENT DOCUMENTS

| 4,096,549 | 6/1978 | Anderson et al. | 431/359 |
| 4,101,259 | 7/1978 | Shaffer et al. | 431/359 |
| 4,101,260 | 7/1978 | Wanninkhof | 431/359 |

Primary Examiner—Benjamin R. Padgett
Assistant Examiner—Irwin Gluck
Attorney, Agent, or Firm—Edward J. Coleman

[57] ABSTRACT

A photoflash unit comprising a linear array of flashlamps mounted on a printed circuit strip disposed within the longitudinal channel of an elongated housing member. A light-transmitting cover panel is attached to the housing member for enclosing the flashlamps. To prevent sympathetic ignition of adjacent lamps, the one-piece cover is molded to have integrally projecting transverse webs which function as light-attenuating partitions between respective pairs of lamps. In addition, the webs bridge the housing channel to provide structural rigidity.

18 Claims, 5 Drawing Figures

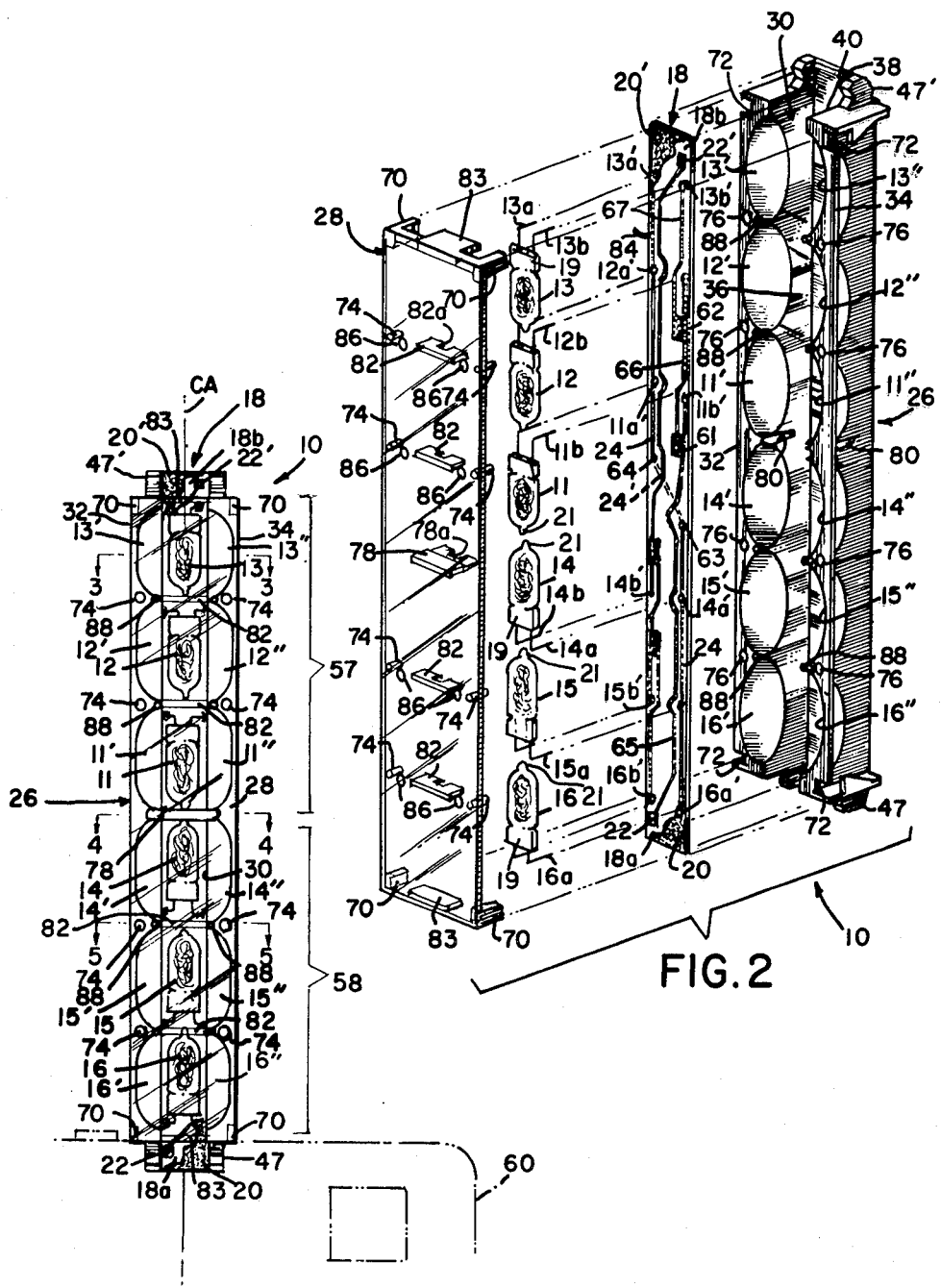

COVER FOR MULTILAMP PHOTOFLASH UNIT

BACKGROUND OF THE INVENTION

This invention relates to multilamp photoflash units and, more particularly, to an improved cover configuration for preventing sympathetic flashing in compact multilamp photoflash units.

Sympathetic flashing, or ignition, is the terminology used for inadvertent ignition caused by a flashing lamp. Radiant energy from one lamp will fire another lamp if they are in close enough proximity. Multilamp photoflash units commonly available on the market to date have generally not posed a problem with respect to sympathetic flashing. One reason for this is due to the configuration of the array of reflectors associated with the lamps of a given unit. For example, in the units known as the flashcube, such as described in U.S. Pat. No. 3,327,105, and the magnitude, such as described in U.S. Pat. No. 3,730,669, four lamps are arranged behind respective light-transmitting reflecting sidewalls of a four sided enclosure, and an array of concave reflectors respectively associated with the lamps inherently blocks any direct radiation from one lamp to the other by virtue of physical configuration. The same holds true for the rivets referred to as a flashbar, such as described in U.S. Pat. No. 3,857,667, wherein back-to-back horizontal reflector arrays of five lamps each face in opposite directions. Further, in certain embodiments of the units referred to as flipflash, a plurality of lamps are disposed in a planar array of concave refllectors which separate one lamp from another; an example of an eight-lamp array is described in U.S. Pat. No. 4,133,023, and an example of a ten-lamp array is described in U.S. Pat. No. 4,164,007.

Another reason contributing to minimization of the problem of sympathetic flashing is due to the size of the photoflash unit, and the orientation and spacing between lamps. For example, in the embodiment of a flipflash unit described in U.S. Pat. Nos. 3,894,226 and 3,937,946, for example, there are open spaces between adjacent lamps in a column. However, the comparatively larger spacing between lamps, and the fact that the lamps are oriented such that at least one and in some instances two press-seal bases intervene in the light path between lamps, makes the probability of sympathetic flashing quite insignificant.

Sympathetic flashing, however, can pose a problem where chemical photoflash lamps are densely packaged close to one another, particularly when reflectors are not used. Such is the case, for example, in U.S. Pat. Nos. 4,055,759, 4,070,145 and 4,076,488, wherein a plurality of percussively ignitable flashlamps are closely spaced in linear arrays for providing a hand actuated signal device. In this instance, the denoted patents describe the use of opaque partitions between adjacent lamps to prevent sympathetic ignition. In an example disclosed, each partition is a separate planar element wedged into a respective slot into a support member. It is also disclosed that a partition may have reflective surfaces.

A copending patent application Ser. No. 072,251 filed concurrently herewith and assigned to the present assignee, describes a more compact, cost-efficient photoflash unit construction comprising a linear array of electrically ignitable flashlamps mounted on a printed circuit board in the form of an elongated strip. The printed circuit strip is located within the longitudinal channel of an elongated housing member having reflective surfaces adjacent to the lamps. A light-transmitting cover panel is attached to the front of the housing member to enclose the flashlamps. The lamps have substantially tubular envelopes and are positioned extremely close to one another with their longitudinal axes substantially parallel to a surface of the printed circuit strip and in substantially coaxial alignment. An end of the circuit strip extends beyond the cover panel to expose terminals thereon for connection to a camera. Typically the diameter of the lamps, the width of the printed circuit strip and the width of the channel and the housing member are nearly equal.

The linear photoflash array of the aforementioned copending application Ser. No. 072,251 attains significant economy of manufacture through the use of a single integral component as both the reflector member and the rear housing of the unit, thereby eliminating a separate base or rear housing member. Further economy of manufacture is realized by the use of essentially full metalization of the reflector housing member as an electrostatic shield for the circuit board and lamps carried internally thereof thereby eliminating the need for separate cost increasing shields. These and other aspects contributing to the integrality of construction, product simplicity and economy of manufacture result in a more cost-effective and pocketable unit and facilitates the practical marketing of separate arrays custom-tailored to the now-divergent needs of conventional and instant picture systems. For example, using the same basic construction, the unit can be dimensioned to provide double-ended arrays having three comparatively lower output flashlamps in each half of the units (a total of six lamps) for use with conventional cameras employing high speed film, or the unit can be figured to provide a double-ended array of two higher output lamps associated with larger reflectors in each half of the array (a total of four lamps) for use with instant picture cameras. In each case, the overall length of the unit would be approximately the same or slightly larger than the flipflash units mentioned hereinbefore.

In view of the extreme compactness of the above-described linear array, with the lamps positioned extremely close to one another along an open channel, with reflective sidewalls, the possibility of undesired sympathetic ignition of adjacent lamps becomes a much more significant problem. The compactness of the array must be maintained to deliver the pocketable package size which is more attractive to the customer. This eliminates the option of making the unit larger so that the lamps are further apart. The lamps also cannot be separated by reflector walls because such configuration would also undesirably increase the size of the array. Further, the use of a plurality of individual partition members secured to the rear housing member by wedging them into slots provided therein, such as disclosed in the aforementioned U.S. Pat. No. 4,055,759 relating to a signal device, is inconsistent with the aforementioned objectives of integrality of construction, product simplicity, economy of manufacture, cost-effectiveness and pocket-sized compactness.

SUMMARY OF THE INVENTION

Accordingly, it is an object of the present invention to provide an improved multilamp photoflash unit which is significantly more compact but avoids sympathetic ignition between adjacent lamps.

A principal object is to provide means for preventing sympathetic ignition between adjacent lamps in a multilamp photoflash unit having a simplified, more cost-efficient construction which is significantly more compact.

These and other objects, advantages and features are attained in a multilamp photoflash unit comprising a housing member, a plurality of flashlamps mounted in the housing member, and a light-transmitting cover member attached to the housing member and enclosing the flashlamps therein, by forming the cover member to have an integrally projecting light attenuating partition which is disposed between a respective pair of the flashlamps to prevent sympathetic ignition therebetween. In an array of three or more lamps, the means for preventing sympathetic ignition may comprise a plurality of light-attenuating partitions integrally projecting from the cover member and disposed between respective pairs of the flashlamps.

In a preferred embodiment, the housing member comprises a single molded piece of plastic material having an elongated shape with a longitudinal channel therein. The flashlamps are mounted in a linear array within the channel with the longitudinal axes of the lamps in coaxial alignment. The cover member is a substantially rectangular panel, and the light-attenuating partitions are one or more transverse webs which project from the cover and bridge the channel. The cover panel including the one or more transverse webs projecting therefrom comprise a single molded piece of plastic material. In an embodiment wherein the channel has a substantially semi-rectangular cross-section, and the housing member includes outer flanges adjoining the channel and containing reflector cavity segments, the projecting cover webs can provide the dual functions of both preventing sympathetic ignition of adjacent lamps and enhancing the structural rigidity of the unit. For example, according to a preferred embodiment, a transverse web projecting from the center of the cover engages and is secured to slots in opposite sidewalls of the channel, and any additional transverse webs bridge the channel in nonengageable proximity to the sidewalls. In this manner, the means for preventing sympathetic ignition also prevents collapse of the channel sidewalls and consequent displacement of the reflector segments.

The transverse webs formed of and projecting from the cover panel extend sufficiently into the channel to prevent sympathetic ignition between the adjacent lamps. Accordingly, due to the close proximity of the lamps, clearance notches are provided in the webs for accommodating the exhaust tip end of respective lamp envelopes.

The integral cover panel configuration of the invention has proved to be well adapted for providing a reliable, compact product by means of high speed production assembly processes. The resulting photoflash unit avoids sympathetic flashing of lamps while retaining the advantageous features of product simplicity, compactness and integrality of construction.

BRIEF DESCRIPTION OF THE DRAWINGS

This invention will be more fully described hereinafter in conjunction with the accompanying drawings, in which:

FIG. 1 is a front elevation of a multilamp photoflash unit in accordance with the invention, with the camera on which it is mounted shown in phantom;

FIG. 2 is an exploded perspective view of the photoflash unit of FIG. 1;

DESCRIPTION OF PREFERRED EMBODIMENT

Figure 3:
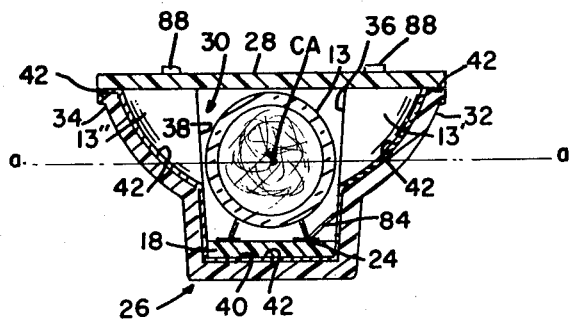
FIG. 3 is an enlarged cross-sectional view taken along 3—3 of FIG. 1.

FIGS. 1 and 2 illustrate a multilamp photoflash unit 10 similar to that described in the aforementioned copending application Ser. No. 72,251. It comprises a linear array of six flashlamps 11-13 and 14-16 mounted on a printed circuiit board 18 in the form of an elongated strip. Each of the lamps has a pair of lead-in wires 11a, 11b, etc. connected to the printed circuitry on strip 18. For example, the lead-in wires 11a, 11b, etc., may be soldered to respective connector pads 11a', 11b', etc., forming portions of the conductive circuit runs on strip 18. Each of the lamps 11, etc. has a tubular light-transmitting glass envelope having a press-seal base 19 at one end through which the lead-in wires emerge, and an exhaust tip 21 at the other end. The envelope is filled with a quantity of filamentary combustible material, such as shredded zirconium and a combustion-supporting gas, such as oxygen. The ignition means within the lamp envelope may comprise, in the case of a low voltage source, a filament connected across the inner ends of the lead-in wires with beads of primer material disposed about the junctions of the lead-in wires and filament. In the case of a high voltage power source, for which the illustrated embodiment is particularly intended, the ignition structure may comprise a primer bridge or a spark gap type construction. For example, a particularly suitable high-voltage type flashlamp suitable for use in the linear array according to the present invention is described in U.S. Pat. No. 4,059,389, wherein the ignition structure comprises a pair of spaced apart lead-in wires with spherically shaped terminations, a glass frit coating over the lead-in wires and a coating of primer material over the frit-coated terminations. The primer may bridge the wire terminations or comprise separate spaced apart coatings on the respective terminations, with the filamentary combustible being in contact with both terminations to provide a conducting path therebetween.

When the flashlamps are mounted and positioned on circuit strip 18, the lead-in wires 11a, 11b, etc., are bent at a right angle, as illustrated, so that all of the tubular envelopes of the lamps are positioned with the longitudinal axes thereof substantially parallel to the surface of printed circuit strip 18 and arranged in a substantially coaxial alignment along a common longitudinal axis CA. Further, as described in copending application Ser. No. 072,526, filed concurrently herewith and assigned to the present assignee, the three lamps 11-13 at the top half of the array are inverted with respect to the three lamps 14-16 at the bottom half of the array.

Referring to FIG. 2, the circuit strip 18 has a "printed circuit" thereon for causing sequential flashing of the lamps by applied firing voltage pulses. In this particular embodiment, essentially the entire printed circuit is provided on one surface of the strip 18, namely, the obverse side of the strip over which the flashlamps are positioned. The substrate of strip 18 comprises an insulating material, such as polystyrene, and the pattern of conductor runs may be provided on the surface thereof by means such as silk screening, chemical etching, etc. Each end of the circuit strip 18 functions as a connector tab, denoted as 18a and 18b respectively. The tab 18a is provided with a pair of electrical terminals 20 and 22, and similarly, the tab 18b is provided with a pair of terminals 20' and 22' for contacting terminals of a camera socket for applying firing voltage pulses to the array. As will be described in more detail hereinafter, the terminal 20 and 20' form part of and are connected to a common circuit conductor run 24 which is connected electrically to one lead-in wire of each of the flashlamps. As a result, terminals 20 and 20' function as part of a "ground" circuit and are shown as having an enlarged configuration for reducing the likelihood of lamps being accidentally flashed by electrostatic voltage when the array is handled.

The circuit strip-lamp assembly, which forms the functional core of the unit 10, is enclosed in a comparatively simple and compact housing construction of a cost-efficient and versatile design. More specifically, the unit enclosure comprises just two components, namely, a rear housing member 26 and a light-transmitting cover panel 28. Referring also to FIG. 3, housing member 26 has an elongated configuration and includes a longitudinal channel 30 which has a cross-section which is substantially semi-rectangular. The circuit strip-lamp assembly is located within channel 30, and cover panel 28 is attached to the front of the housing 26 so as to enclose the lamps. As illustrated in FIG. 1, the ends of tabs, 18a and 18b of the circuit strip extend beyond the opposite ends of the elongated cover panel 28 to expose the terminals 20, 22 and 20', 22' thereon for connection to a camera.

The rear housing member 26 further includes outer flanges 32 and 34 which adjoin the opposite sidewalls 36 and 38, respectively, of the semi-rectangular channel. Formed in these outer flanges are a plurality of symmetrical segments of parabolic reflector cavities, with each pair of reflector cavity segments 11', 11'', etc. on opposite sides of the channel 30 being associated with a respective one of the flashlamps 11, etc. Housing member 26 is molded of an insulating plastic material, such as polystyrene, but reflective surfaces are provided adjacent to all the flashlamps by covering all of the surfaces of channel 30 (i.e., sidewalls 36 and 38 and rear wall 40) and the surfaces of the outer flanges 32 and 34 which face the cover panel, including the parabolic reflector cavity segments 11', 11'', etc., with a continuous coating of conductive reflective material 42. For example, the channel and front surfaces of the flanges may be metalized, such as by an aluminum vacuum deposition process. In this manner, member 26 integrally functions as a compact, cost-efficient, multi-cavity reflector member in addition to functioning as a rear housing enclosure. It will be noted that the lamp-carrying terminal strip is located substantially internal to this reflector member. Further, referring particularly to FIGS. 1 and 3, it will also be noted that the common longitudinal axis CA of the linear array of flashlamps 11, etc., is substantially parallel to the longitudinal axes of printed circuit strip 18 and channel 30 and lies in a plane a—a which symmetrically intersects the parabolic reflector cavity segments 11', 11'', etc. on opposite sides of the channel. Hence, portions of the reflector cavities and sidewall reflective surfaces are located behind the longitudinal center line of the lamps so that as each lamp is flashed, light is projected forwardly of the array.

The housing member further includes integral extensions 47 and 47' at the opposite ends thereof which partly surround and protect the extending connector tabs 18a and 18b of the printed circuit strip 18, exposing the terminals thereon, and also functions to facilitate mechanical attachment to the camera socket. The printed circuit strip 18 may be secured in channel 30 by means such as providing an interference fit with walls 36 and 38 or by applying a cement between the back of the strip 18 and the rear channel wall 40 (FIG. 3).

The light-transmitting cover panel 28 basically comprises a planar strip of clear plastic material, such as polystyrene, and may be attached to the plastic rear housing member 26 by conventional methods, such as the use of cement or ultrasonic welding about the periphery. Improved structural rigidity and cost-efficiency, however, are provided by a preferred method of attachment described in copending application Ser. No. 072,529, filed concurrently herewith and assigned to the present assignee. Referring to FIGS. 1 and 2, the cover panel molding includes four rectangular corner posts 70 which fit into corresponding slots 72 in the housing member flanges and straddle respective ends thereof. These corner posts grip the sides of housing member 26 on the outside and are ultrasonically welded thereto. This secures the ends of the panel and prevents spreading of the respective ends of the housing.

Figure 4:
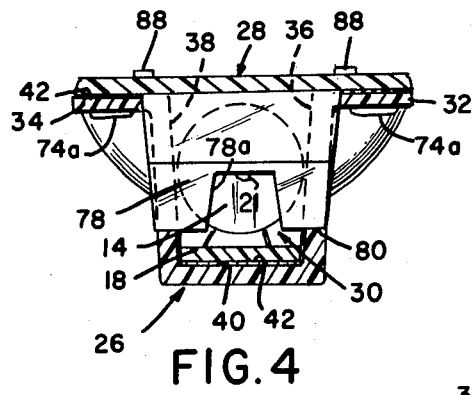
FIG. 4 is an enlarged cross-sectional view taken along 4—4 of FIG. 1 to show the central web.

Referring also to FIG. 4, the cover panel 28 molding further includes a transverse web 78 which projects from the center of the cover panel normal to the plane thereof and fits within center slots 80 on the sidewalls 36 and 38 of the housing channel 30. Ultrasonic welding is also employed to secure each side of the web 78 which engages a slot 80. As illustrated, web 78 thereby bridges the housing channel 30 to provide oppositely directed forces with respect to the four corner posts 70 so as to prevent collapse of the central portion of the cover panel and channel and assure a snug fit.

Figure 5:
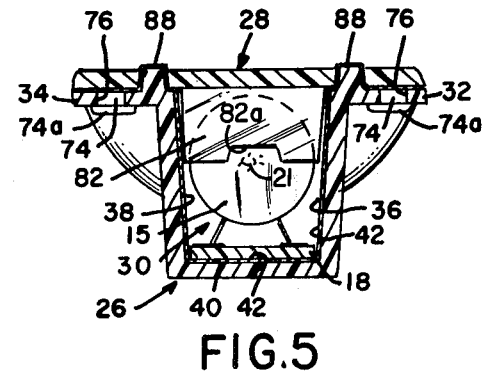
FIG. 5 is an enlarged cross-sectional view taken along 5—5 of FIG. 1 to show one of the additional webs.

Referring to FIG. 5, the cover panel 28 molding also includes a plurality of cylindrical side posts 74 projecting from the cover panel normal to the plane thereof at spaced intervals along two longitudinal sides thereof. More specifically, in the six-lamp unit illustrated, there are a total of eight side posts 74, with four posts symmetrically disposed on each side of the panel. The cylindrical side posts 74 respectively fit into a plurality of openings or holes, 76 located at spaced intervals along each of two longitudinal sides of the housing member 26. More specifically, four pairs of the holes are symmetrically disposed on opposite sides of the channel 30 in the housing member flanges 32 and 34 between reflector cavity segments 11', 11'' and 12', 12''; 12', 12'' and 13', 13''; 14', 14'' and 15', 15''; and 15', 15'' and 16', 16''. Ultrasonically heated and pressure-formed rivet heads 74a (FIG. 5) are formed on the ends of these posts to secure the longitudinal edges of the cover to the housing.

Further yet, the cover panel 28 molding includes a plurality of additional transverse webs 82 and 83 projecting from the cover panel normal to the plane thereof and at spaced intervals therealong. Two of the additional transverse webs, denoted as 83, are disposed at opposite ends of the cover panel 28; i.e. at the ends of the panel beyond which the end tabs 18a and 18b of the printed circuit strip extend. Four of the additional transverse webs, denoted as 82, are each aligned with a respective pair of the side posts 74 on opposite sides of the channel 30. All of the additional transverse webs 82 and 83 bridge channel 30 in nonengageable proximity to the opposite side walls 36 and 38 thereof (FIG. 5) to enhance structural rigidity by preventing inward collapse of the channel 30. The end result of the aforementioned cover attachment features is a rigid product which is resistant to spreading open, under, say, the 80–100 pounds force of ultrasonic welding, due to the external location of the posts 70 and 74. Inward collapse of the U-channel reflector housing member is prevented by the internal webs, thereby preventing resultant displacement of the reflector cavity segments 11', 11", etc., and insuring proper reflector placement relative to the lamps, which is necessary for maximum light gathering efficiency.

As will be described in detail hereinafter, the webs 78 and 82, which integrally project from the cover panel, are disposed between adjacent lamps, made sufficiently large and particularly adapted to provide light-attenuating partitions for preventing sympathetic flashing according to the present invention.

When fully assembled, the completed photoflash unit according to the invention is provided with a plug-in connector tab 18a at the lower end thereof which is adapted to fit into a camera or flash adapter. A second plug-in connector tab 18b is provided at the top end of the unit whereby the array is adapted to be attached to the camera socket in either of two orientations, i.e. with either the tab 18a or 18b plugged into the socket. The lamps are arranged in two groups of three disposed on the upper and lower halves, respectively, of the elongated linear array. Upper group 57 comprises lamps 11–13, and the lower group 58 includes lamps 14–16; the reflector cavity segments 11', 11", etc., along with the reflective channel sidewalls, are associated with the respective lamps so that as each lamp is flashed, light is projected forwardly of the array. The lamps are arranged and connected so that when the array is connected to a camera by the connector tab 18a (such as illustrated in FIG. 1 for the case of camera 60 shown in phantom) only the upper group 57 of the lamps will be flashed, and when the array is turned end for end and connected to the camera by the other connector tab 18b, only the then upper group 58 of lamps will be flashed. By this arrangement, only lamps relatively far from the camera lens are flashable, thus reducing the undesirable red-eye effect.

Referring to FIG. 2, the circuit board 18 has a "printed circuit" thereon for causing sequential flashing of the lamps by firing voltage pulses applied to the terminals 20, 22, 20', 22'. The top and bottom of the printed circuitry preferably are reverse mirror images of each other. The circuit locates on the upper half of the circuit strip 18 and activated by the pair of terminals 20 and 22 includes three lamps 11–13 arranged in parallel across the input terminals. The circuit also includes two normally open (N/O) radiant-energy-activated connect switches 61 and 62 for providing sequential flashing of the lamps 11–13 in response to firing pulses successively applied to the input terminals 20 and 22. Each N/O connect switch is responsive to the flashing of an associated lamp to form a closed circuit condition. One terminal (lead-in wire) of each of the lamps 11–13 is connected in common by means of an electrical "ground" circuit run 24 to input terminal 20. The "ground" circuit run 24 includes the terminals 20 and 20' and makes contact with one of the lead-in wires for each of the lamps 11–16. This "ground" circuit crossover is accomplished at the midportion of the circuit strip, without interferring with the "hot," or signal, conductor runs by terminating the common conductor runs 24 on each half of the strip at through-connection points 63 and 64, such as eyelets passing through the strip by a common conductor segment, indicated as 24'.

The first lamp to be fired, namely, lamp 11, is connected directly across the input terminals 20 and 22. The N/O connect switches 61 and 62 are series connected in that order with lamp 13, which is the third and last lamp to be fired, across the input terminals 20 and 22. The second lamp to be fired (lamp 12) is series connected with the N/O switch 61.

Terminal 22 is part of a "hot" or signal circuit conductor run 65 that terminates at a lead-in wire of lamp 11 and one terminal of the N/O switch 61. The other side of switch 61 is connected to a lead-in wire of lamp 12 and to one terminal of N/O switch 62 via circuit run 66. Circuit run 67 then connects the other terminal or switch 62 to a lead-in wire of lamp 13.

The radiant-energy-activated N/O connect switches 61 and 62 are in contact with and bridge across the circuit runs that are connected to them. The material for the connect switch is selected to be of the type initially having an open circuit or high resistance, the resistance thereof becoming literally zero or a lower value when the material receives radiation in the form of heat and/or light from a respective adjacent lamp, upon the lamp being flashed. For this purpose, each of the connect switches is respectively positioned behind and near to an associated flashlamp. More specifically, switch 61 is positioned behind lamp 11, and switch 62 is positioned behind lamp 12.

The high resistance paste used to make switches 61 and 62 may comprise a known mixture of silver compound and a binder. According to a preferred embodiment, however, the material comprises a silver compound such as silver carbonate, a binder such as polystyrene resin, a large proportion of electrically non-conductive inert particulate solids, such as titanium dioxide, and a protecting oxidizing agent such as barium chromate. For example, as described in copending application Ser. No. 21,398, filed Mar. 19, 1979, and assigned to the present assignee, the dried composition of a specific silk screenable high resistance material comprises 67.43% silver carbonate 22.48% titanium dioxide, 8.99% glass beads, 0.11% barium chromate, 0.07% lecithin as a wetting agent, and 0.91% polystyrene resin as a binder. The barium chromate was included to enhance environmental stability, as described in U.S. Pat. No. 4,087,233. This mixture is made into a paste by ball milling in a suitable solvent such as butyl cellosolve acetate. The solids content may be adjusted to suit the method of switch application. For silk screening over a circuit strip, it is preferred to adjust the solids content to about 74%.

The circuit on the circuit strip 18 functions as follows. Assuming that none of the three lamps on the upper half of the unit have been flashed, upon occurrence of the first firing pulse applied across the terminals 20 and 22, this pulse will be directly applied to the lead-in wires of the first-connected flashlamp 11, whereupon lamp 11 flashes and becomes an open circuit between its lead-in wires. Heat and/or light radiation from the flashing first lamp 11 is operative to activate the N/O connect switch 61. As a result, the radiation causes the normally open connect switch 61 to become a closed circuit (or a low value of resistance), thereby connecting the circuit strip terminal 22 electrically to the second lamp 12 via circuit run 66. By the time this occurs, the firing pulse has diminished to a value insufficient to cause the second lamp 12 to flash. When the next firing pulse occurs, it is applied to the lead-in wires of the second lamp 12 via the now closed connect switch 61, whereupon the second lamp 12 flashes and becomes an open circuit between its lead-in wires, with the lamp radiation causing the connect switch 62 to assume a near zero or low resistance. When the next firing pulse occurs, it is applied via the now closed connect switches 61 and 62 to the lead-in wires of the third flashlamp 13, thereupon causing the lamp to flash. Since this lamp is the last lamp in the active circuit, it does not matter whether its lead-in wires are an open or closed circuit after flashing. When the flash unit is turned around and the other connector tab 18b attached to the camera socket, the group 58 of lamps that then becomes upper most and farthest away from the camera lens will be in the active circuit and will be flashed in the same manner as has been described. In a preferred embodiment, the lamps 11, etc., are high-voltage types requiring about 2,000 volts, for example, at low current for flashing, and they can be fired by impacting or stressing a piezoelectric element in the camera.

The high degree of electrical sensitivity needed in high-voltage flashlamps gives rise to distinct problems of inadvertent flashing during handling of the array package. Any static charges on equipment and personnel can cause the lamp to flash. Accordingly, as described in the aforementioned copending application Ser. No. 072,251, electrostatic protection is provided by the rear housing member 26 in a cost-efficient manner by electrically connecting the conductive coating 42 to the common circuit conductor 24 by means such as a wire 84 soldered therebetween (FIGS. 2 and 3). In this manner, continuous conductive surfaces on rear wall 40 and sidewalls 36 and 38 of channel 30, and on the reflector cavities and front faces of outer flanges 32 and 34, provide a protective electrostatic shield about three sides of the sensitive circuit strip 18 and the lamps 11–16 mounted thereon.

Protection against electrostatic charges about the front face of the unit is provided in a manner following the teachings of U.S. Pat. No. 4,113,424. Cover panel 28 is provided with eight openings 86 distributed throughout the length thereof, as illustrated, and housing member 26 further includes eight metal-coated posts, or projections, 88 which respectively fit into the front face openings 86. Preferably, the conductive reflector projections protrude through the openings 86 in the cover panel beyond the exterior surface thereof, as shown in FIG. 3, so as to assure electrical contact with any charged object such as a user's hand, which may touch the array housing.

As illustrated in FIGS. 1 and 2, projections 88 are symmetrically disposed on the front face of the housing flanges 32 and 34 between reflector cavity segments 11', 11'' and 12', 12''; 12', 12''', and 13', 13''; 14', 14'' and 15', 15''; and 15', 15'' and 16', 16''. These projections 88 are integral molded portions of the insulating plastic material of housing 26 which are covered with the continuous conductive reflective coating 42. Accordingly, the conductive projection 88 are connected to the common circuit conductor 24 via the surface coating 42 and wire 84.

In accordance with the present invention, the cover panel 28 is provided with one or more integral projections which are disposed between respective pairs of flashlamps and are adapted to provide light-attenuating partitions therebetween for preventing sympathetic ignition. In the preferred embodiment illustrated, cover panel 28, including the posts 70 and 74, and the webs 82 and 83, is a single molded piece formed of a plastic insulating material, such as polystyrene. The planar portion of the cover panel is clear and light-transmitting, although the conventional blue tinting may be employed for color correction purposes, as is well known in the photoflash art. The integral webs 78 and 82 project normal to the major plane of cover 28 and, by virtue of means, such as an etched light-diffusing surface, are rendered light-attenuating as compared to the planar face of the cover panel. According to the invention, these structural rigidizing webs are extended into channel 30 sufficiently to also serve as light-attenuating partitions for preventing sympathetic flashing.

More specifically, in the linear array illustrated in FIGS. 1 and 2, wherein lamps 11–13 are inverted with respect to lamps 14–16, the pair of lamps 11 and 14 are the most sensitive to sympathetic flashing. This is due to the fact that the exhaust tips 21 of these two lamp envelopes face one another. There is no light-diffusing press-seal base 19 intervening in the light path between these lamps. To avoid sympathetic flashing between lamps 11 and 14, the transverse web 78 projects from the center of panel 28, as best shown in FIG. 4, so as to fully bridge and extend into channel 30 between the tips 21 of lamps 11 and 14 until the web nearly reaches the surface of circuit strip 18. A clearance notch 78a is provided in web 78 for accommodating the exhaust tips of the lamps 11 and 14. The parttion-web 78 masks a significant proportion of the direct and reflected light (from sidewalls 36 and 38) between lamps 11 and 14 and, thereby, effectively prevents sympathetic flashing therebetween.

The additional projecting webs 82 are spaced along the panel 28 so as to bridge and respectively extend into channel 30 between the tip 21 of lamp 16 and base 19 of lamp 15, the tip of lamp 15 and base of lamp 14, the base of lamp 11 and tip of lamp 12, and the base of lamp 12 and tip of lamp 13. Since the partitions provided by webs 82 are all interposed in a light path between adjacent lamps which includes a light-diffusing press-seal base, the extension of webs 82 (FIG. 5) is not requiired to be as deep as web 78. Further, due to the close spacing of the lamps, the webs 82 cannot extend as deep as web 78 in order to provide clearance for the lead-in wires 11a, 11b, etc. emerging from the lamp bases 19. A clearance notch 82a (FIG. 5) is provided in each of the webs 82 for accommodating the exhaust tips of respective lamps.

The cover configuration of the invention provides the function of sympathetic flash prevention while still retaining the objectives of compactness and simplified product construction and assembly. The flashlamps 11–16 are mounted on the circuit strip 18 which is then placed in channel 30 of the one-piece housing member 26. Cover panel 28 is then placed over the housing member channel to enclose the lamps therein, and posts 70 and 74 are fitted into respective slots 72 and holes 76. Upon application of ultrasonic welding and heating, a secure, rigidized structure is provided with the integral light-attenuating partition webs 78 and 82 conveniently fitted in place between respective pairs of lamps. Due to the described configuration of the webs 78 and 82, assembly of the cover is readily accomplished without interfering with the lamp mountings.

Although the invention has been described with respect to a specific embodiment, it will be appreciated that modifications and changes may be made by those skilled in the art without departing from the true spirit and scope of the invention. For example, the construction is not limited to linear high voltage arrays but is also adaptable to elongated planar arrays, and the like, containing lamps ignitable by high voltage or low voltage sources, or by percussive activation. The array may be single ended, with a connector on only one end; the lamps may also be oriented in one direction; and the number of lamps may vary. For example, a higher output lamp array of the double ended type may comprise two lamps of much larger volume positioned in each of the upper and lower groups housed in a package of slightly larger dimensions. Further, in a large array, only the central web 78 may be necessary. On the other hand, the webs 82 may be as large as web 78, if space permits; this may be necessary for webs between higher output lamps. In alternative embodiments of photoflash units, notching may not be required, and structural rigidizing may be provided by means other than the light-attenuating partitions. The integral partitions may be rendered light-attenuating, even to the extend of being opaque, by alternative means such as mold surface effects to provide light-diffusion in the plastic, surface roughening after molding and, less desirably, applying a light-attenuating coating.

We claim:

1. In a multilamp photoflash unit commprising a housing member, a plurality of flashlamps mounted in said housing member, and a light-transmitting cover member attached to said housing member and enclosing said flashlamps therein, means for preventing sympathetic ignition of adjacent lamps comprising a light-attenuating partition integrally projecting from said cover member and disposed between a respective pair of said flashlamps.

2. The photoflash unit of claim 1 wherein said plurality of flashlamps mounted in said housing comprises three or more lamps, and said means for preventing sympathetic ignition comprises a plurality of light-attenuating partitions integrally projecting from said cover member and disposed between respective pairs of flashlamps.

3. The photoflash unit of claim 1 wherein said housing member has an elongated shape with a longitudinal channel therein, said plurality of flashlamps are mounted in said channel, said cover member is a substantially rectangular panel, and light-attenuating partition is a transverse web bridging said channel.

4. The photoflash unit of claim 3 wherein said plurality of flashlamps mounted in said housing channel comprises three or more lamps, and said means for preventing sympathetic ignition comprises a plurallity of light-attenuating transverse webs integrally projecting from said cover panel and disposed between respective pairs of said flashlamps, each of said webs bridging said channel.

5. The photoflash unit of claim 4 wherein said plurality of transverse webs bridge said channel in nonengageable proximity to the opposite sidewalls thereof for enhancing the structural rigidity of said unit in addition to preventing sympathetic ignition between adjacent lamps.

6. The photoflash unit of claim 4 wherein said flashlamps have substantially tubular envelopes and are positioned with the longitudinal axes thereof in substantially coaxial alignment, said flashlamp envelopes each have a base at one end from which lead-in wires emerge by which the lamp is mounted and an exhaust tip at the opposite end, and each of said transverse webs has a clearance notch for accommodating the exhaust tip end of a respective one of said lamp envelopes.

7. The photoflash unit of claim 3 wherein said housing member has a pair of center slots at the midportion of said housing member in opposite sidewalls of said channel, and said transverse web integrally projects from said center of said cover panel and fits into said center slots and is secured thereto, whereby said transverse web bridges said channel at the midportion thereof to provide outwardly directed forces of the channel sidewalls for enhancing structural rigidity of said unit in addition to preventing sympathetic ignition between the lamps partitioned by said web.

8. The photoflash lamp of claim 7 wherein said flashlamps have substantially tubular envelopes and are disposed in a linear array along said channel with the longitudinal axes of the lamps in substantially coaxial alignment.

9. The photoflash unit of claim 8 wherein said flashlamp envelopes each have a base at one end from which lead-in wires emerge by which the lamp is mounted and an exhaust tip at the opposite end, the lamps mounted in one half of the housing channel are inverted with respect to the lamps in the other half of the channel whereby the exhaust tips of two of said lamp envelopes are facing one another at the center of the channel, and said transverse web has a clearance notch for accommodating said facing exhaust tips.

10. The photoflash unit of claim 7 wherein said housing member comprises a single molded piece formed of a plastic insulating material, said cover panel including said transverse web comprises a single molded piece formed of plastic insulating material, and said transverse web projecting from the center of said cover panel is secured to said center slots in the housing member channel by ultrasonic welding.

11. The photoflash unit of claim 7 wherein said channel in the housing member has a cross-section which is substantially semi-rectangular, said housing member further includes outer flanges adjoining the opposite sidewalls of said semi-rectangular channel, a plurality of segments of reflector cavities are formed in said outer flanges, each pair of reflector cavity segments on opposite sides of said channel are associated with a respective one of said flashlamps, and a continuous coating of reflective material covers the surfaces of said channel sidewalls and the surfaces of said outer flanges facing said cover panel including said reflector cavity segments.

12. The photoflash unit of claim 11 wherein said unit further includes a printed circuit board in the form of an elongated strip and having lamp firing circuitry thereon, said plurality of flashlamps are disposed in a linear array along said printed circuit strip and have lead-in wires connected to said circuitry, an end of said printed circuit strip contains terminals connected to said lamp-firing circuitry, said circuit strip is located within said channel in the housing member, said end of the circuit strip extends beyond said cover panel to expose said terminals thereon for connection to a camera, said array of flashlamps along said printed circuit strip comprises four or more lamps, said cover panel includes a plurality of additional transverse webs integrally projecting therefrom and disposed between respective pairs of said flashlamps for preventing sympathetic ignition therebetween, and said additional transverse webs bridge said channel in nonengagable proximity to the opposite sidewalls thereof for enhancing the structural rigidity of said unit in addition to preventing sympathetic ignitions between adjacent lamps.

13. The photoflash unit of claim 12 wherein said linear array of flashlamps is divided into first and second groups of two or more lamps each disposed in respectively opposite halves of said printed circuit strip, said printed circuit strip includes first and second connector means at respectively opposite ends thereof, said first connector means being located on the half of said circuit strip containing said first group of lamps and separated thereby from said second group of lamps, said second connector means being located on the half of said circuit strip containing said second group of lamps and separated thereby from said first group of lamps, a portion of said circuitry couples said first connector means to each lamp of said second group of lamps, another portion of said circuitry couples said second connector means to each lamp of said first group of lamps, said first and second connector means comprise respective sets of terminals on opposite ends of said printed circuit strip, and said ends of the printed circuit strip extend beyond opposite ends of said cover panel to expose said terminals thereon for connection to a camera.

14. The photoflash unit of claim 1 wherein said light-attenuating partition extends sufficiently from said cover member to prevent sympathetic ignition between said pair of lamps adjacent thereto.

15. The photoflash unit of claim 14 wherein said partition masks a significant proportion of the light between said lamps adjacent thereto.

16. The photoflash unit of claim 15 wherein said flashlamps have substantially tubular envelopes and are positioned with the longitudinal axes thereof in substantially coaxial alignment, said flashlamp envelopes each have a base at one end from which lead-in wires emerge by which the lamp is mounted and an exhaust tip at the opposite end, and said partition has a clearance notch for accommodating the exhaust tip of a respective one of said lamp envelopes.

17. The photoflash unit of claim 1 wherein said cover member including said partition comprises a single molded piece formed of a plastic material.

18. The photoflash unit of claim 17 wherein said cover member has a planar light-transmitting panel from which said partition projects, and said partition is light-attenuating as compared to said planar panel.

* * * * *